(12) United States Patent
Fischer et al.

(10) Patent No.: US 8,518,140 B2
(45) Date of Patent: Aug. 27, 2013

(54) FILTER ELEMENT FRAMES

(75) Inventors: Niels Fischer, Wendeburg (DE); Heiko Brinkmann, Salzgilter-Bad (DE)

(73) Assignee: Madison Filter 981 Ltd., Haslingden Lancashire (GB)

( * ) Notice: Subject to any disclaimer, the term of this patent is extended or adjusted under 35 U.S.C. 154(b) by 327 days.

(21) Appl. No.: 12/808,408

(22) PCT Filed: Dec. 22, 2008

(86) PCT No.: PCT/GB2008/004261
§ 371 (c)(1),
(2), (4) Date: Oct. 8, 2010

(87) PCT Pub. No.: WO2009/081166
PCT Pub. Date: Jul. 2, 2009

(65) Prior Publication Data
US 2011/0016837 A1    Jan. 27, 2011

(30) Foreign Application Priority Data
Dec. 21, 2007   (GB) .................................. 0725015.2

(51) Int. Cl.
*B01D 39/00* (2006.01)
(52) U.S. Cl.
USPC ................... 55/497; 55/502; 55/521; 55/524; 96/134

(58) Field of Classification Search
USPC ..................... 55/497, 502, 521, 524; 96/134; 264/258; 156/293
See application file for complete search history.

(56) References Cited

U.S. PATENT DOCUMENTS

| 4,595,607 | A | 6/1986 | Betteridge et al. |
| 4,746,339 | A | 5/1988 | Millard |
| 2001/0032545 | A1* | 10/2001 | Goto et al. ....................... 96/134 |
| 2004/0083957 | A1 | 5/2004 | Latvis |
| 2006/0272303 | A1* | 12/2006 | Fujiwara et al. ................ 55/486 |

FOREIGN PATENT DOCUMENTS

| CH | 557192 | 12/1974 |
| EP | 1016514 A2 | 7/2000 |
| GB | 1266883 | 3/1973 |
| GB | 2044135 A | 10/1980 |
| GB | 2244942 A | 12/1991 |
| GB | 2285596 A | 7/1995 |
| GB | 2294468 A | 5/1996 |
| WO | 2005051518 A1 | 6/2005 |

* cited by examiner

*Primary Examiner* — Robert Clemente
*Assistant Examiner* — Karla Hawkins
(74) *Attorney, Agent, or Firm* — Barlow, Josephs & Holmes, Ltd.

(57) ABSTRACT

A filter element comprises a top frame member, a bottom frame member and a pleated filter assembly received in respective channel sectioned formers comprised by said top and bottom frame members. The formers are integrally bonded with a polyurethane resin core formed in the formers. A mold may include a core member or projections which maintain air passages during molding, and serve to locate the pleats of the filter element in relation to the air passages.

12 Claims, 4 Drawing Sheets

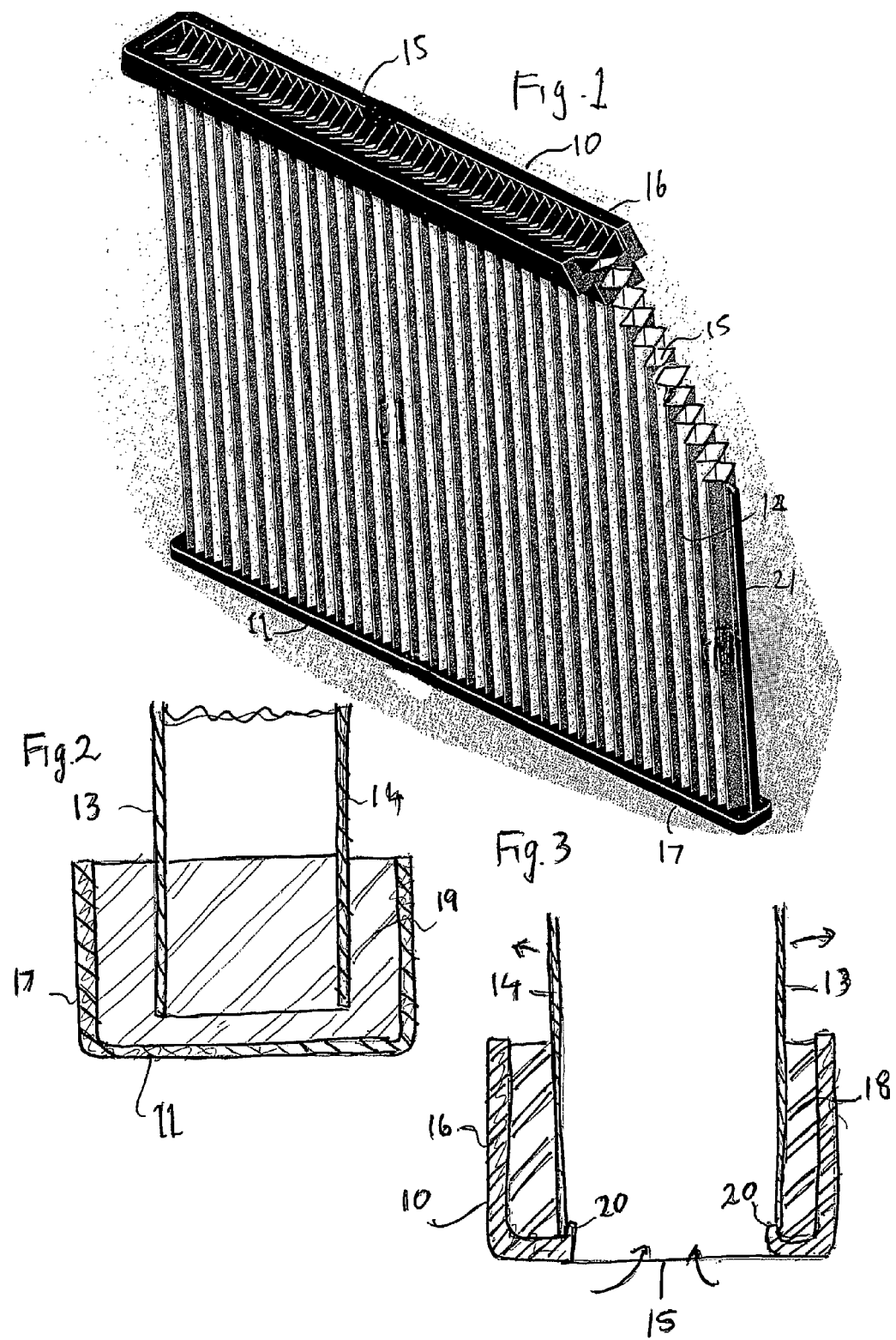

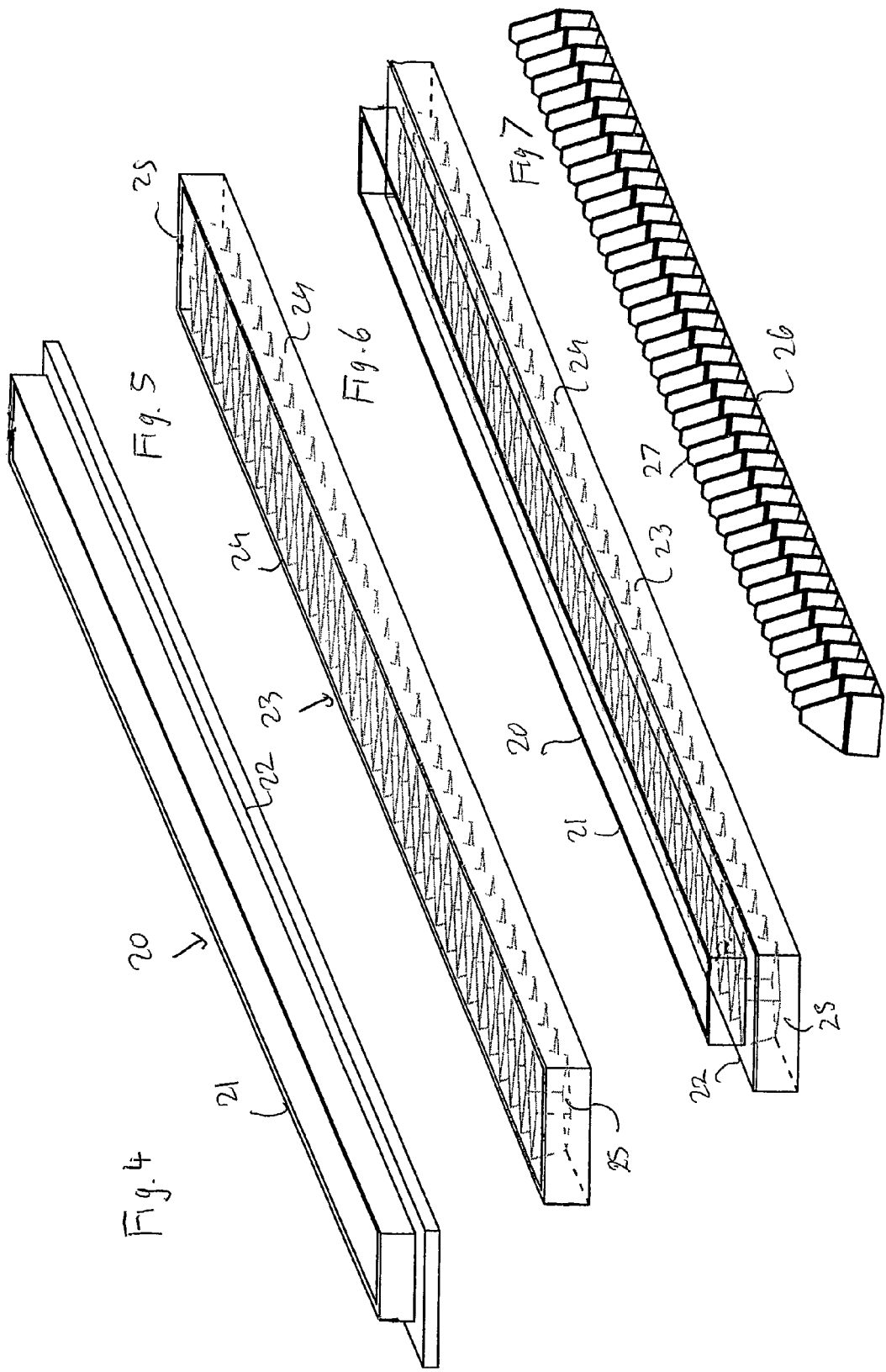

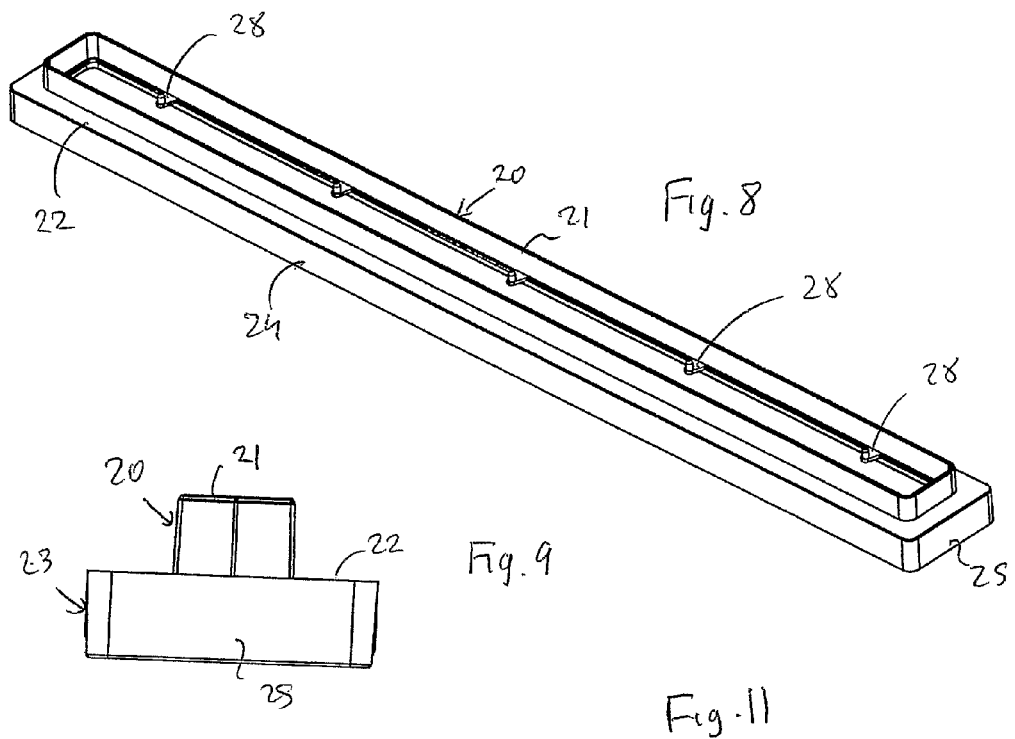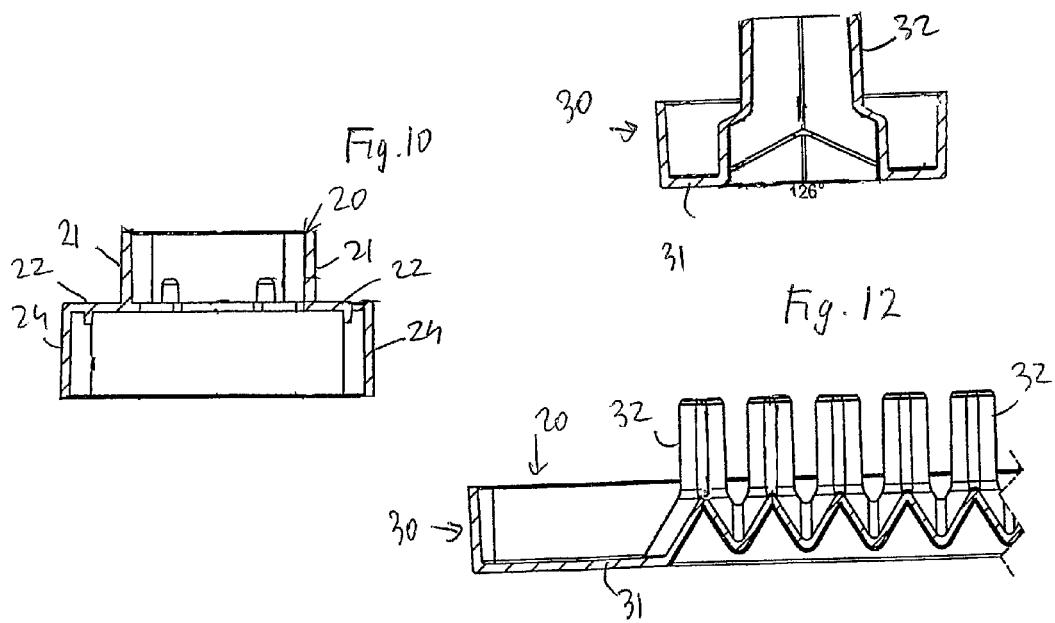

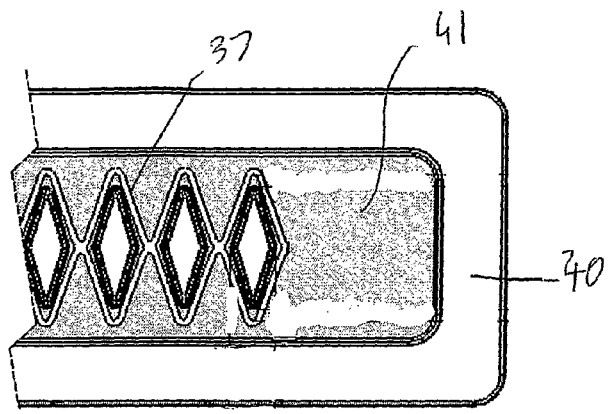
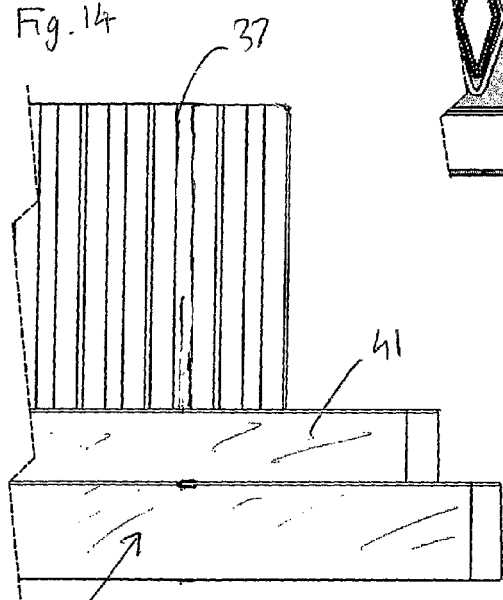
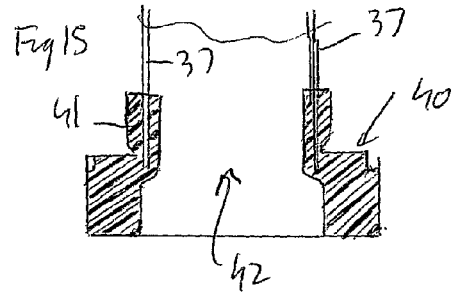
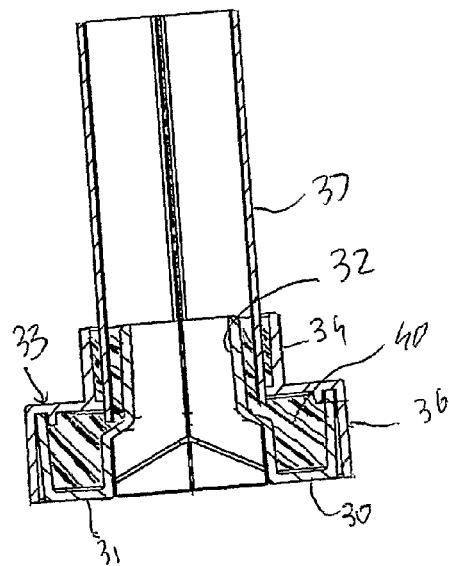

FILTER ELEMENT FRAMES

This invention relates to improvements in frames for filter elements used in gas filtration, in particular for the retention of pleated filter elements.

Pleated filter elements are formed of a pair of filter cloths having their pleats aligned so that lozenge or diamond shaped spaces are formed between the cloths. The filter elements are anchored and retained in place by having their upper and lower edges received in channel shaped frame members, and cast in place using a suitable resin. The vertical edges of the filter cloths may be secured by clip or more complex arrangements to prevent sideways leakage. The upper frame member is formed with apertures to allow exit of the clean gas from the spaces between the filter cloths, but the lower frame member is solid, as the gas enters by passing through the filter fabrics from the outside, leaving the dust on the outside of the fabric. Cleaning is achieved by a reverse flow pulse from the top into the spaces and through the filter cloths to dislodge the dust from the outer face of the fabric.

In present day practice, the frame members are moulded, with the filter cloths in place, in re-usable machined steel moulds, using any of a variety of resins, most commonly polyurethane. To maintain the required shape of the moulded members it is necessary to insert rigid inserts into the mould, which are incorporated as reinforcing members in the structure of the moulded part.

Disadvantages of these frame members include expense of manufacture, because of the requirement to add reinforcement to prevent shrinkage upon cooling of the resin, and to maintain necessary rigidity, and brittleness which limits their resistance to shocks sustained in (mis)handling incidents, and also the cost of machining the moulds initially. The resin does not adhere to the mould, and is prone to shrinkage upon cooling.

It is thus an object of the present invention to provide an improved frame for a filter element which is resistant to shocks through reduced brittleness, and does not require the provision of expensive machined moulds, and a method for the manufacture of such an improved frame.

The invention accordingly provides, from a first aspect, a frame member for a pleated filter element comprising an integral channel sectioned former bonded to a core of a synthetic resin.

The invention also provides, from a second aspect, a method of manufacturing a frame member for a pleated filter element, comprising forming a core of a synthetic resin in a channel sectioned former so as to bond the former to the core in an integral structure.

The edge regions of a filter element, preferably a pair of pleated filter cloths, are preferably inserted in the channel sectioned former before introducing the resin to form the core, so that the filter element edge is cast into the resin core in known manner.

The former is preferably of a material which is compatible with the resin used, to bond thereto, and bonding may be assisted by providing roughening of the interior surface of the channel sectioned former.

The material of the channel sectioned former preferably comprises a plastics material containing or consisting of a fibrous material. The fibrous material may assist the roughening of the surface of the former for bonding to the resin core. Materials from which the former is made may be selected from polyesters; polyethylene terephthalate (PET); polyamides (eg P84 polyamide fibres); polypropylene (or PPS (polyphenylene sulphide) as the matrix material and for the fibrous material. Also, the matrix material may be rubber; acrylonitrile butadiene styrene (ABS); polyethylene; polyurethane; or other resins, synthetic rubbers, or plastics.

The core which is formed in the channel sectioned frame member may be selected from a range of resins, including epoxy; polyurethane; polyethylene; ABS; polypropylene or the like.

Preferably, the materials of the channel sectioned member and of the core are such as to impart a degree of flexibility to the finished frame member.

The core material may be a cold-curing resin; thermo-curing or thermosetting. Two component resin systems may be mixed immediately before pouring, and cured in-situ by cold-curing or thermo-curing. In the case of thermoplastics, such as polyolefins, the plastic is heated to a fluent state then allowed to set on cooling in situ.

In the case of the bottom frame member of a filter assembly, the former may be a simple trough shaped member with closed ends. In the case of an upper frame member, apertures must be provided in the base of the channel to allow filtered air to exit the interior of the pleats of the filter element, and preferably locating means are provided to ensure alignment of the pleats with the apertures.

The frame members may be made anti-static by inclusion of steel, copper sulphide, silver or epitropic anti-static fibres, or by graphite treatment.

The frame members may also be frame retardant.

Preferred embodiments of frame members for filter elements, and method of making the same in accordance with the invention will now be further described by way of example, with reference to the accompanying drawings, wherein:

FIG. 1 is a half-tone perspective view of a compact pleated filter element provided with top and bottom frame members in accordance with the invention;

FIG. 2 is a diagrammatic cross-section of the bottom frame member of the filter element of FIG. 1;

FIG. 3 is a diagrammatic cross-section of the top frame member of the filter element of FIG. 1.

FIG. 4 is a perspective view of a first upper part of a mould for a frame member of a pleated filter element;

FIG. 5 is a similar view of a second lower part of the mould;

FIG. 6 is a perspective view of the two mould parts combined to form a mould for the frame member;

FIG. 7 is a perspective view of a core part for insertion into the mould before moulding, to keep air passages free;

FIG. 8 is a perspective view of the mould from a different view point;

FIG. 9 is an end view of the mould of FIG. 8;

FIG. 10 is a sectional view of the mould;

FIG. 11 is a transverse sectional view of an end part of an air duct insert;

FIG. 12 is a longitudinal sectional view of the end part of the air duct insert;

FIG. 13 is a view from above of an end part of a moulded end frame member produced from the mould, with pleated filter elements in place;

FIG. 14 is a side view of the said end part;

FIG. 15 is a fragmentary sectional view of the frame member; and

FIG. 16 shows the mould filled with plastics material with filter element in place, in a moulding step.

FIG. 1 shows a general view of a filter element comprising a top frame member 10, a bottom frame member 11, and a pleated filter assembly 12 comprising two filter cloths 13, 14 formed with pleats which are aligned to provide lozenge shaped volumes between the cloths into which unfiltered air or gas is drawn through the filter cloths, and exits through apertures 15 in the top frame member 10. These are somewhat simplified in the drawing. The vertical edges of the filter assembly 12 are secured by clamping strips 21.

The top frame member 10 and the bottom frame member 11 each comprise a respective channel sectioned former 16, 17, which is integrally bonded with a polyurethane resin core 18, 19 formed therein. The formers are closed at each end, and thus constitute trough-shaped members.

The polyurethane resin is introduced into each former as a two-phase system, with the end regions of the filter cloths 13, 14 forming the pleated filter assembly 12 in place in the channel. In the lower frame member 11, the resin core is introduced around the outside of the pleats and also into the lower ends of the lozenge shaped volumes. In the case of the upper frame member 10, however, the edges of the filter cloths are butted against the floor of the channel sectioned former 16, and located e.g. by rims 20, with the volumes in alignment with the apertures 15, and the resin material of the core 18 is excluded from the interiors of the pleats (or volumes) to ensure that filtered air can exit the filter assembly 12 through the top frame member 10.

The channel sectioned formers 16, 17 are in the preferred embodiment comprised of polyester fibres in a matrix of polyurethane. The interior surfaces of the formers are roughened, either by deliberate texturing, or simply by exposure of fibres through the surface of the matrix. This roughening enhances bonding between the former and the core. The use of similar resins e.g. polyurethane also enhances the bonding between them.

However a range of materials may be used to manufacture the former, and a range of resins or other suitable materials used for the core, as indicated hereinbefore.

The core and former should have a degree of flexibility.

FIGS. 4 to 7 illustrate an embodiment of moulding member for forming of a frame member.

As shown in FIGS. 4,5,6 and 7, a mould for casting a frame member for a pleated filter comprises an upper cover part 20 as shown in FIG. 4, which comprises an upright frame 21, with a flange 22 around the bottom edge of the frame. An elongate rectangular trough member 23 forms a lower part for the mould, and is shown in FIG. 5, comprising a base web surrounded by side and end webs 24,25. the cover part 20 is superposed on the trough member 23, as shown in FIG. 6.

As shown in FIG. 6, the mould would be suitable for casting a simple frame member of the type shown in FIGS. 2 and 3, and as part 17 in FIG. 1. However to cast a more complex number such as the top air inlet frame member 15 of FIG. 1, further components are required.

FIG. 7 shows a core member 26 which comprises an array of teeth 27 which can be inserted from below through the floor of the trough member 23, to project upwardly into or through the frame 21 of the cover part 20.

The floor of the trough member 23 is formed with apertures for the teeth 27.

The teeth 27 serve both to locate the pleats of the filter element, and keep air passages from below the frame into the interiors of the pleats open during a moulding operation. The core member 26 is removed after completion of moulding, as the first step in removing the mould.

FIG. 8 shows the assembled mould of FIG. 6 from another view point, which shows that tabs 28 are provided at spaced intervals along the inner bottom edges of the side webs 24, to seat the webs on the floor of the trough member 22.

FIGS. 9 and 10 show end and sectional views of the mould, respectively.

FIGS. 11 and 12 show a variation, wherein the core member 26 is united with the trough member to form a mould base 30, with side members and a bottom web 31, with a plurality of upstanding pleat former projections 32, each defining a passage through the base up into the pleats of the filter cloth. FIG. 11 is a transverse sectional view, while FIG. 12 is a fragmentary longitudinal cross-section of an end part of the member 30.

FIG. 16 is a sectional view illustrating a mould of the type shown in FIGS. 11 and 12 with the moulding cavities filled with plastics material, such as a polyurethane or any of the other materials mentioned hereinbefore with a pleated filter element in place and held in place by the mould during moulding. The mould comprises a base member 30, as in FIGS. 11 and 12, with pleat locating and air passage maintaining projections 32, which fuses a trough member, and a cover part 33 defines an enclosure 34 defined by side walls, a cover 35 and overlapping lower side walls 36. The filter cloth pleats 37 are embedded in the plastics. The moulded frame member 40 produced is shown in FIG. 15 in a fragmentary cross-section. The edges of the filter cloth 37 are embedded in a an upper part 41 of the moulded article, and air passages 42 are formed, after removal of the projections 32 which pass through the member 40 into the interior of the pleats.

A side elevation of an end of the filter element is shown in FIG. 14, and a plan view of the same end part is shown in FIG. 13.

The former can be mass-produced as a low cost moulded article and can be easily made in a range of sizes and configurations, and new or modified designs may be adopted quickly. There is no need for the expensive design and fabrication of expensive metal mould structures which would otherwise be needed for each redesign.

The shrinkage of the resin, e.g. polyurethane in curing has been found not to be a problem, and good bonding between the former and the core is attained to form a single integral structure.

No rigid inserts are required, and the flexible member is not brittle and so is highly resistant to breakage or fracture. The filter assembly may be disposed of by incineration, and the general appearance of the assembly can be improved, and the process of manufacturing filter assemblies speeded up.

The invention claimed is:

1. A filter element comprising a frame member for a pleated filter element, said frame comprising an integral channel sectioned former (16/17) bonded to a core of a synthetic resin (18/19) wherein apertures are provided in the base of the channel of the former to allow filtered air to exit the interior of the filter element wherein the edge regions of a filter element comprising a pair of pleated filter cloths (13/14) are inserted in the channel sectioned former (16/17) such that the pleats align with the apertures in the base of the channel of the former, wherein the edge regions of the filter element are cast into the resin core (18/19).

2. A filter element according to claim 1, wherein the former (16/17) is of a material which is compatible with the resin used so as to bond to the resin and wherein the interior surface of the channel provided by the former is roughened to assist bonding.

3. A frame member according to claim 1, wherein the material of the channel sectioned former (16/17) comprises a plastics material containing a fibrous material.

4. A filter element according to claim 3, wherein the former (16/17) is made from a material selected from polyesters, polyethylene terephthalate, polyamides, polypropylene or polyphenylene sulphide.

5. A filter element according to claim 3, wherein the matrix material is selected from polypropylene, rubber, acrylonitrile butadiene styrene; polyethylene, polyurethane or other resins, synthetic rubbers or plastics.

6. A filter element according to claim 3, wherein the core (18/19) formed in the channel of the frame member (16/17) is selected from a resin from expoxy, polyurethane, polyethylene, ABS (acrylonitrile butadiene styrene); or polypropylene.

7. A filter element according to claim 1, wherein in the bottom frame member (11) of a filter assembly, the former comprises a simple trough shaped member with closed ends.

8. A filter element according to claim 1, which is rendered anti-static by inclusion of steel, copper sulphide, silver, or epitropic anti-static fibres, or by graphite treatment.

9. A filter element according to claim 1, which is flame retardant.

10. A filter element according to claim 1, which is formed to provide air passages to the interiors of the pleats (37) of the filter element.

11. A method of manufacturing a frame member for a pleated filter element, comprising forming a core of a synthetic resin in a channel sectioned former (16/17) so as to bond the former to the core in an integral structure wherein apertures are provided in the base of the channel of the former to allow filtered air to exit the interior of the filter element, wherein the edge regions of a filter element comprising a pair of pleated filter cloths (13/14) are inserted in the channel sectioned former such that the pleats align with the apertures in the base of the channel of the former and resin then introduced to form the core, so tha the edge regions of the filter element are cast into the resin core.

12. A method according to claim 11, wherein a mould is used which provides means for maintaining air passages through the frame member and for locating the pleats (37) of the filter element in relation to the air passages during moulding.

* * * * *